United States Patent
Nakano et al.

(10) Patent No.: US 7,555,779 B2
(45) Date of Patent: Jun. 30, 2009

(54) COPYRIGHT PROTECTION SYSTEM, RECORDING DEVICE, AND REPRODUCTION DEVICE

(75) Inventors: Toshihisa Nakano, Neyagawa (JP); Shunji Harada, Osaka (JP); Natsume Matsuzaki, Minou (JP); Makoto Tatebayashi, Takarazka (JP)

(73) Assignee: Panasonic Corporation, Osaka (JP)

( * ) Notice: Subject to any disclaimer, the term of this patent is extended or adjusted under 35 U.S.C. 154(b) by 514 days.

(21) Appl. No.: 10/213,154

(22) Filed: Aug. 7, 2002

(65) Prior Publication Data
US 2003/0152222 A1    Aug. 14, 2003

(30) Foreign Application Priority Data
Aug. 8, 2001  (JP)  ............................. 2001-240778
Aug. 30, 2001  (JP)  ............................. 2001-260932

(51) Int. Cl.
*H04K 1/00*    (2006.01)
*H04K 9/32*    (2006.01)

(52) U.S. Cl. ......................................... 726/26; 726/31
(58) Field of Classification Search ................. 380/202; 705/56, 58; 726/26, 31
See application file for complete search history.

(56) References Cited

U.S. PATENT DOCUMENTS

| | | | |
|---|---|---|---|
| 4,817,140 A * | 3/1989 | Chandra et al. | ................ 705/55 |
| 4,991,208 A * | 2/1991 | Walker et al. | ................ 380/239 |
| 5,392,351 A | 2/1995 | Hasebe et al. | |
| 5,555,304 A | 9/1996 | Hasebe et al. | |
| 5,881,152 A * | 3/1999 | Moos | ......................... 713/193 |
| 6,081,785 A * | 6/2000 | Oshima et al. | ................. 705/1 |
| 6,118,873 A * | 9/2000 | Lotspiech et al. | ........... 380/277 |
| 6,189,146 B1 | 2/2001 | Misra et al. | |
| 6,301,663 B1 * | 10/2001 | Kato et al. | ................... 713/176 |

(Continued)

FOREIGN PATENT DOCUMENTS
EP    0 878 796 A2    11/1998

(Continued)

OTHER PUBLICATIONS
"Message authentication code." Wikipedia, The Free Encyclopedia. May 27, 2007, 09:07 UTC. Wikimedia Foundation, Inc. Jun. 9, 2007 <http://en.wikipedia.org/w/index.php?title=Message_authentication_code&oldid=133818539>, pp. 1-3.*

*Primary Examiner*—Christopher J Brown
(74) *Attorney, Agent, or Firm*—Wenderoth, Lind & Ponack, L.L.P.

(57) ABSTRACT

A copyright protection system includes a recording device and a reproduction device. The recording device writes encrypted content, an encrypted content key for decrypting the encrypted content, and license information on a recording medium on which a unique media number has been recorded in an unrewritable state. The license information is generated using both the media number and the encrypted content key, and therefore reflects both values. The reproduction device reads the media number, the encrypted content key, and the license information from the recording medium, and judges whether the license information reflects both the media number and the encrypted content key. The reproduction device decrypts the encrypted content key, and decrypts the encrypted content using the content key only if the license information reflects both values. Thus, the copyright protection system allows only original recording media to be reproduced, and prohibits reproduction of copy recording media.

15 Claims, 11 Drawing Sheets

U.S. PATENT DOCUMENTS

| | | |
|---|---|---|
| 6,360,320 B1 * | 3/2002 | Ishiguro et al. ............. 713/164 |
| 6,367,019 B1 * | 4/2002 | Ansell et al. ................. 726/26 |
| 6,550,011 B1 * | 4/2003 | Sims, III ..................... 713/193 |
| 6,748,539 B1 * | 6/2004 | Lotspiech .................... 726/20 |
| 6,832,319 B1 * | 12/2004 | Bell et al. ................... 713/193 |
| 6,834,349 B1 * | 12/2004 | Higurashi et al. ........... 713/193 |
| 6,865,550 B1 * | 3/2005 | Cok ............................ 705/51 |
| 2002/0026424 A1 | 2/2002 | Akashi |
| 2002/0114461 A1 * | 8/2002 | Shimada et al. ............. 380/201 |

FOREIGN PATENT DOCUMENTS

| | | |
|---|---|---|
| EP | 1 006 727 | 7/2000 |
| EP | 1 035 543 A2 | 9/2000 |
| EP | 1 098 311 A1 | 5/2001 |
| EP | 1 128 598 A1 | 8/2001 |
| JP | 10283270 | 10/1998 |
| JP | 10-293724 | 11/1998 |
| JP | 11224461 | 8/1999 |
| JP | 2000-175162 | 6/2000 |
| WO | 01/18731 A1 | 3/2001 |
| WO | 02/056203 A1 | 7/2002 |

* cited by examiner

COPYRIGHT PROTECTION SYSTEM, RECORDING DEVICE, AND REPRODUCTION DEVICE

This application is based on applications Nos. 2001-240778 and 2001-260932 filed in Japan, the contents of which are hereby incorporated by reference.

BACKGROUND OF THE INVENTION

1. Field of the Invention

The present invention relates to techniques for protecting a copyright of content recorded on a writable recording medium on which a media number unique to the recording medium has been recorded.

2. Prior Art

A content distribution form of receiving content such as a movie film that is broadcast by digital broadcasting, recording the content on a recording medium such as an optical disk, and reproducing the content from the recording medium is becoming widespread in recent years. On the other hand, unauthorized distribution and reproduction of such content by copying the content through a personal computer and the like without license is also increasing.

To block unauthorized copying, a copyright protection system shown in FIG. 1 is conventionally known as a technique of restricting distribution and reproduction of content.

In FIG. 1, the copyright protection system is roughly made up of a recording device 1000 and a reproduction device 3000. The recording device 1000 encrypts content and records the encrypted content on a recording medium 2000. The reproduction device 3000 decrypts the encrypted content recorded on the recording medium 2000, and reproduces the decrypted content. The recording device 1000 includes a key encryption key computing unit 1001, a content key generating unit 1002, a content key encrypting unit 1003, a content storing unit 1004, and a content encrypting unit 1005. The reproduction device 3000 includes a key decryption key computing unit 3001, a content key decrypting unit 3002, a content key temporary storing unit 3003, a content decrypting unit 3004, and a digital AV processing unit 3005.

The recording medium 2000 is a recording medium such as an optical disk, and has a media number area 2001 in which a media number has been recorded. A media number is an identifier that is unique to each recording medium, and is written at the time of manufacturing the recording medium. The media number area 2001 is protected so that the media number recorded at the time of manufacturing cannot be rewritten thereafter.

The recording device 1000 acquires content from the outside, and stores the acquired content in the content storing unit 1004.

When the recording medium 2000 is connected to the recording device 1000, the content encrypting unit 1005 reads the content from the content storing unit 1004, and encrypts the content by using a content key. The content encrypting unit 1005 records the encrypted content in an encrypted content area 2003 of the recording medium 2000. Here, the content key is a random number generated by the content key generating unit 1002. The content key encrypting unit 1003 encrypts the content key by using a content key encryption key, and records the encrypted content key in an encrypted content key area 2002 of the recording medium 2000. Here, the content key encryption key is a key computed by the key encryption key computing unit 1001. The key encryption key computing unit 1001 computes the content key encryption key according to a hash function, by using a master key and the media number recorded in the media number area 2001. The master key is a key which is held commonly by the recording device 1000 and the reproduction device 3000 in secrecy from third parties.

FIG. 2 shows an inner computational mechanism of the key encryption key computing unit 1001.

The media number is input from a point A, and is encrypted by a DES encrypting unit 4000 using the master key held in a master key storing unit 4001 according to DES (Data Encryption Standard). After this, an exclusive-OR operation is performed on the encrypted media number and the media number by an exclusive-OR circuit 4002. The outcome is output from a point B as the content key encryption key.

On the other hand, when the recording medium 2000 is connected to the reproduction device 3000, the key decryption key computing unit 3001 reads the media number from the media number area 2001 of the recording medium 2000. The key decryption key computing unit 3001 performs the same computation as the key encryption key computing unit 1001 in the recording device 1000, to obtain a content key decryption key. Here, if the key decryption key computing unit 3001 uses the same master key and media number as the key encryption key computing unit 1001, the content key decryption key will end up being the same as the content key encryption key.

The content key decrypting unit 3002 reads the encrypted content key from the encrypted content key area 2002, and decrypts the encrypted content key by using the content key decryption key to obtain the content key. The content key decrypting unit 3002 temporarily stores the content key in the content key temporary storing unit 3003.

The content decrypting unit 3004 reads the encrypted content from the encrypted content area 2003, and decrypts the encrypted content by using the content key to obtain the content.

The digital AV processing unit 3005 converts the content to analog audio/video data, and outputs the converted data to external devices such as a speaker and a display.

Thus, the encrypted content key can be decrypted properly only if the reproduction device 3000 uses the same media number as that used for encrypting the content key.

In other words, if the reproduction device 3000 uses a media number which is different from the media number used for encrypting the content key, the encrypted content key cannot be decrypted properly.

Suppose an unauthorized party copies the encrypted content key and encrypted content recorded on the recording medium 2000, to another recording medium. Even if the reproduction device 3000 tries to reproduce this recording medium, the reproduction device 3000 cannot recover the correct content key from the encrypted content key copied on this recording medium, since a media number of this recording medium is different from that of the recording medium 2000.

Thus, the conventional copyright protection system enables the reproduction device 3000 to properly decrypt an encrypted content key of an original recording medium which has been recorded by the recording device 1000. On the other hand, the conventional copyright protection system makes it impossible for the reproduction device 3000 to properly decrypt an encrypted content key of a copy recording medium, thereby preventing content from being distributed by unauthorized copying.

The reproduction device 3000 reproduces a recording medium irrespective of whether the recording medium is an original or a copy. This being so, if the recording medium is a copy, the reproduction device 3000 will end up reproducing unintelligible data which is different from the original content, as video and audio.

A user who is using the recording medium without knowing it is a copy may suspect so, seeing that the reproduced video and audio are abnormal. However, abnormal reproduction can also be caused by other factors such as a malfunction of the device and an error of reading data from the recording medium. Therefore, even if an abnormal reproduction occurs, the user cannot determine right away that the recording medium is a copy.

SUMMARY OF THE INVENTION

The present invention has an object of providing a copyright protection system that can prevent content from being distributed by unauthorized copying. This is done by checking whether a recording medium is an original or a copy, and allowing the recording medium to be reproduced if the recording medium is an original, while prohibiting the recording medium from being reproduced if the recording medium is a copy.

The stated object can be achieved by a copyright protection system including a recording device for recording encrypted content on a recording medium and a decryption device for decrypting the encrypted content recorded on the recording medium. The recording medium has an unrewritable area in which a media number that is unique to the recording medium is recorded. The recording device includes: a generating unit operable to acquire the media number from the recording medium, and generate license information by performing a specific operation using the media number and decryption information so that the license information reflects both the media number and the decryption information, which is needed to decrypt the encrypted content; and a recording unit operable to record the license information, the decryption information, and the encrypted content on the recording medium. The decryption device includes: a judging unit operable to read the media number, the decryption information, and the license information from the recording medium, and judge whether the read license information can be obtained if the specific operation is performed using the read media number and the read decryption information; and a decrypting unit operable to read the encrypted content from the recording medium and decrypt the encrypted content by using the decryption information, only if the judgement by the judging unit is in the affirmative.

With this construction, the license information is generated by using the media number recorded on the recording medium and the decryption information for decrypting the encrypted content, so that the license information reflects both the media number and the decryption information. In more detail, the license information is a hash value that is generated by applying a hash function to input data which is a concatenated value of the media number and the decryption information. Since the hash function involves an irreversible one-way function, it is computationally infeasible to recover the media number and the decryption information from the license information. Also, it is computationally infeasible to generate different input data that hashes to the same license information. This property of the hash function prevents the license information from being obtained by using data other than the media number and decryption information which are used for generating the license information. In other words, if the recording medium is not a copy but an original, the license information recorded on the recording medium can be obtained by applying the hash function to the media number and decryption information recorded on the recording medium. Accordingly, the judging unit judges whether the recording medium is an original or a copy, by checking whether the license information can be obtained if the hash function is performed on the media number and decryption information recorded on the recording medium. If the recording medium is an original, the decrypting unit decrypts the encrypted content. On the other hand, if the recording medium is a copy, the decrypting unit does not decrypt the encrypted content. In this way, content can be protected from being copied to another recording medium and put to use by an unauthorized party.

BRIEF DESCRIPTION OF THE DRAWINGS

These and other objects, advantages and features of the present invention will become apparent from the following description thereof when taken in conjunction with the accompanying drawings which illustrate specific embodiments of the invention.

In the drawings.

DETAILED DESCRIPTION OF THE PREFERRED EMBODIMENTS

First Embodiment

The following describes the first embodiment of the present invention with reference to drawings.

(Construction)

Figure 1:
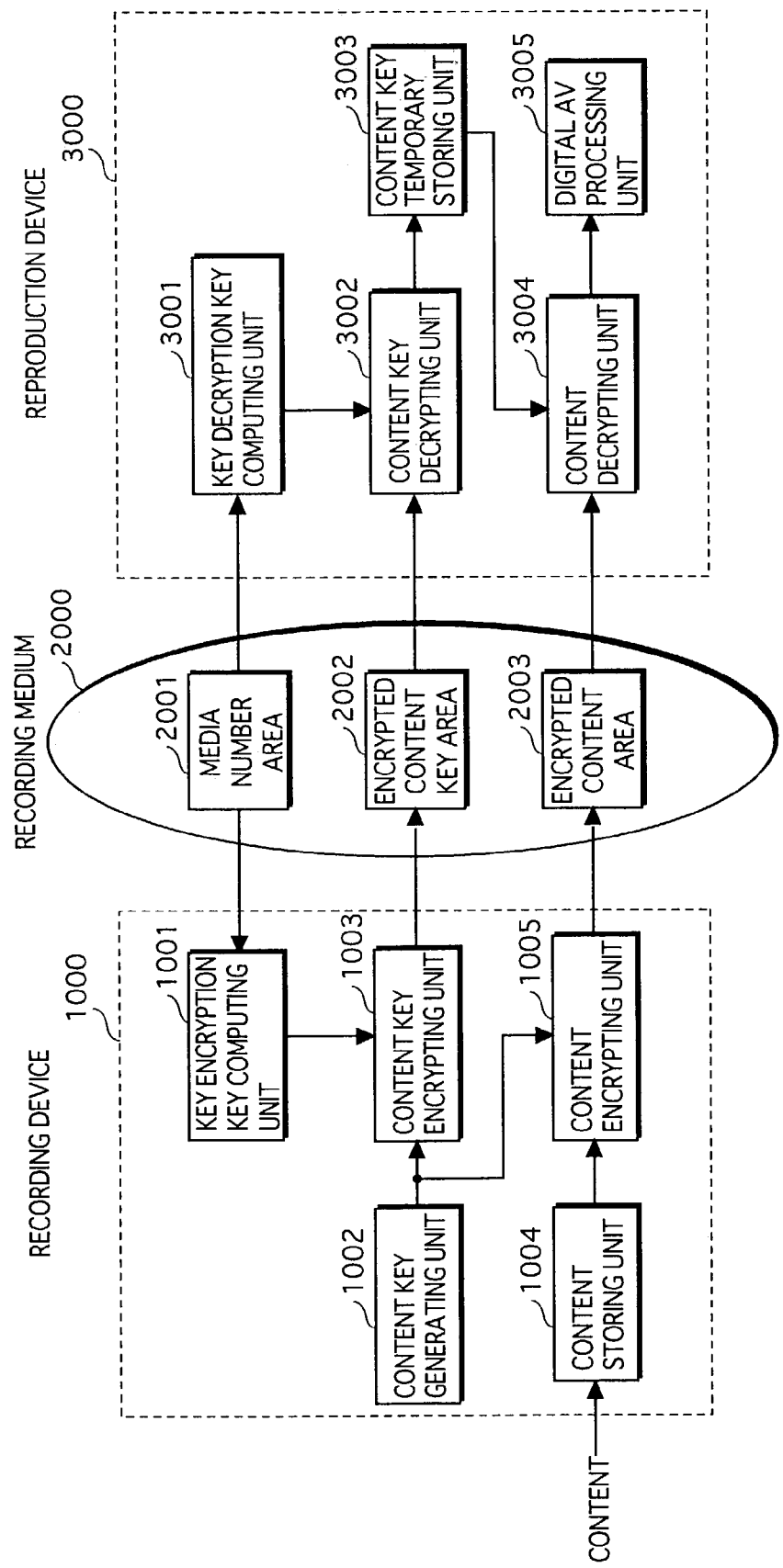
FIG. 1 is a block diagram showing a construction of a conventional copyright protection system.
Figure 2:
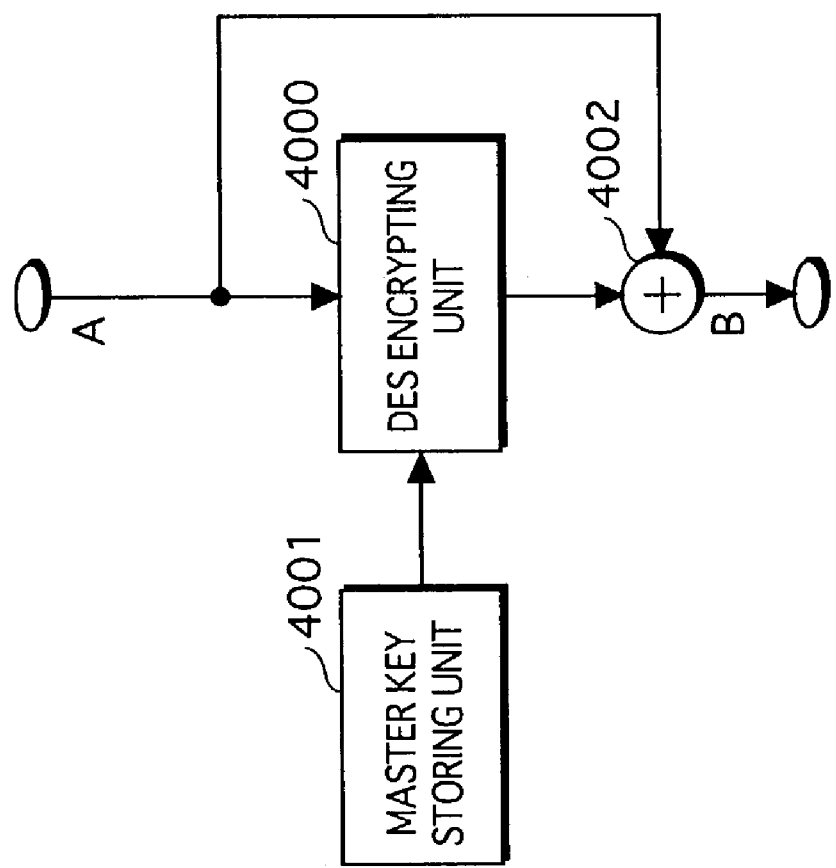
FIG. 2 shows an inner computational mechanism of a key encryption key computing unit shown in FIG. 1.
Figure 3:
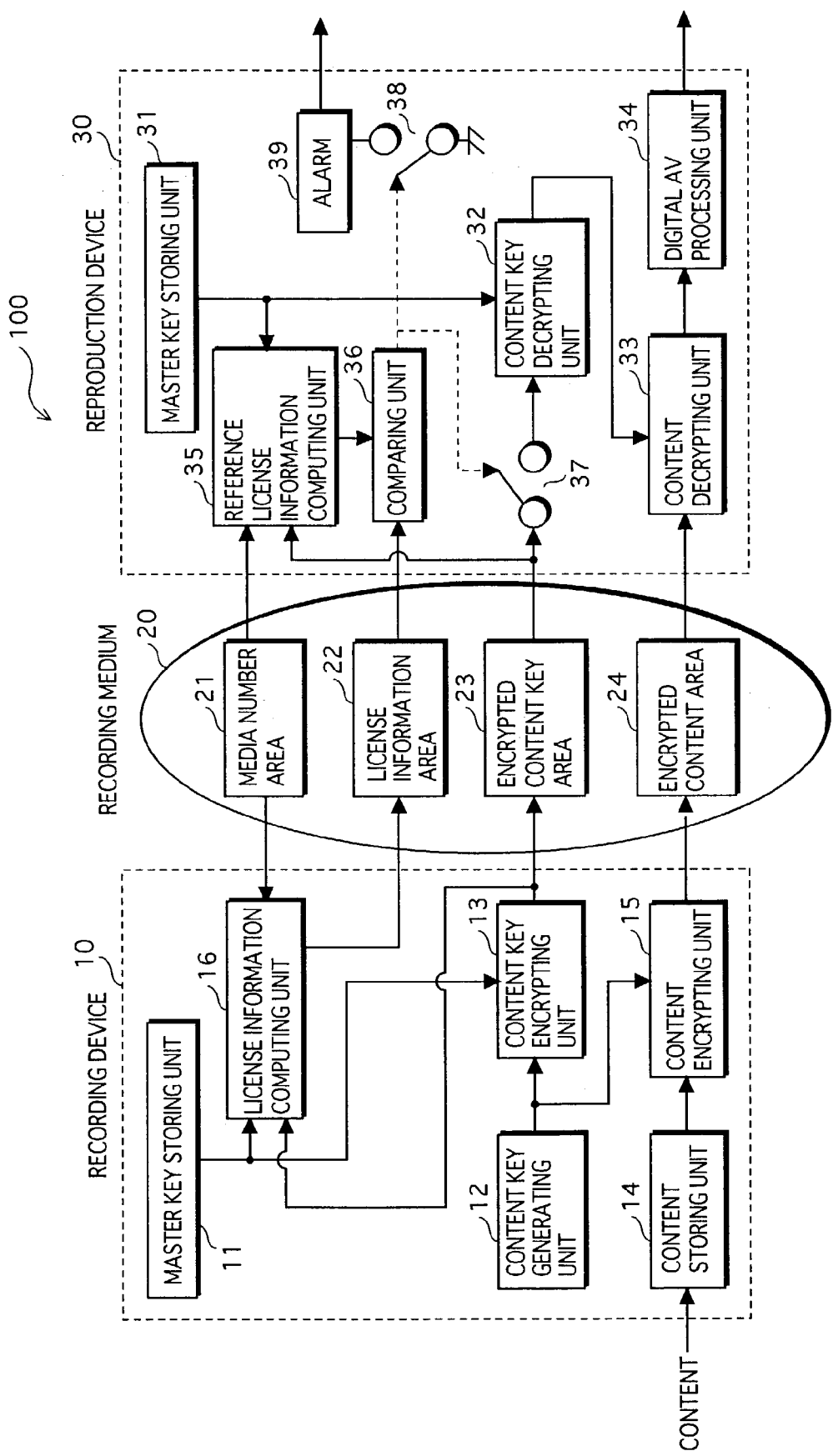
FIG. 3 is a block diagram showing a construction of a copyright protection system to which the first embodiment of the present invention relates.

FIG. 3 is a block diagram showing a construction of a copyright protection system 100 to which the first embodiment of the present invention relates.

The copyright protection system 100 is roughly made up of a recording device 10 and a reproduction device 30. The recording device 10 records encrypted content on a recording medium 20. The reproduction device 30 decrypts the encrypted content recorded on the recording medium 20, and reproduces the decrypted content. The following explanation begins with the recording medium 20, followed by the constructions of the recording device 10 and reproduction device 30.

(Recording Medium 20)

The recording medium 20 is an optical disk. The recording medium 20 has an unrewritable media number area 21 in which a media number has been recorded, and a recordable area.

A media number is a 64-bit identifier that is unique to each recording medium, and is written in the media number area 21 at the time of manufacturing the recording medium. The media number area 21 is protected so that the media number written at the time of manufacturing cannot be rewritten thereafter.

The recordable area is used by the recording device 10 to reserve a license information area 22, an encrypted content key area 23, and an encrypted content area 24. The recording device 10 records various data to these reserved areas.

The encrypted content area 24 is used by the recording device 10 to record encrypted content.

The encrypted content key area 23 is used by the recording device 10 to record an encrypted content key.

The encrypted content key is information which is needed when the reproduction device 30 decrypts the encrypted content. That is, the encrypted content key is a content key in encrypted form. The content key is a secret key of a secret key cipher, and is used for both encrypting and decrypting content.

The license information area 22 is used by the recording device 10 to record license information.

The license information is information used for verifying whether or not the data recorded on the recording medium 20 is original data recorded by the recording device 10. In other words, the license information is used for verifying whether the recording medium 20 is an original or a copy. The reproduction device 30 can determine whether the recording medium 20 is an original or a copy, by checking this license information. The license information is explained in detail later.

(Construction of the Recording Device 10)

The recording device 10 is constructed as follows.

The recording device 10 includes a master key storing unit 11, a content key generating unit 12, a content key encrypting unit 13, a content storing unit 14, a content encrypting unit 15, and a license information computing unit 16.

The master key storing unit 11 is a memory in which a 56-bit master key has been stored in advance. The master key is possessed commonly by the recording device 10 and the reproduction device 30, in secrecy from outside the recording device 10.

The content key generating unit 12 is a random number generator for generating a random number as a content key. Upon receiving a start signal from a control circuit (not illustrated) in the recording device 10, the content key generating unit 12 generates 56-bit random data, and outputs the generated 56-bit random data as a content key.

The content key encrypting unit 13 encrypts the content key by using the master key, and records the encrypted content key on the recording medium 20. Here, an encryption algorithm such as DES is used. In detail, the content key encrypting unit 13 acquires the content key generated by the content key generating unit 12 and the master key stored in the master key storing unit 11, and encrypts the content key by using the master key to obtain the encrypted content key of 64 bits in length. The content key encrypting unit 13 reserves the encrypted content key area 23 in the recordable area of the recording medium 20, and records the encrypted content key to the encrypted content key area 23.

The content storing unit 14 is a storage device such as a hard disk, and stores content which is input from outside the recording device 10. As one example, a satellite broadcast reception device receives digital content of a movie film that is broadcast by digital satellite broadcasting, and inputs the content to the recording device 10 so that the content is stored in the content storing unit 14.

The content encrypting unit 15 encrypts the content by using the content key, and records the encrypted content on the recording medium 20. Here, an encryption algorithm such as DES is used. In detail, the content encrypting unit 15 acquires the content key generated by the content key generating unit 12 and the content stored in the content storing unit 14. The content encrypting unit 15 divides the content into 64-bit blocks, and encrypts each block by using the content key. The content encrypting unit 15 then reserves the encrypted content area 24 in the recordable area of the recording medium 20, and records the encrypted content which is made up of the encrypted blocks to the encrypted content area 24.

The license information computing unit 16 has a computational mechanism for generating license information. The license information computing unit 16 acquires the media number stored in the media number area 21 of the recording medium 20, the encrypted content key generated by the content key encrypting unit 13, and the master key stored in the master key storing unit 11. The license information computing unit 16 concatenates the media number, the master key, and the encrypted content key into one bit string. The license information computing unit 16 takes this bit string as input, and performs a computation according to a hash function such as SHA-1 (Secure Hash Algorithm 1). As a result, the license information computing unit 16 obtains a hash value of 160 bits in length, and sets this hash value as license information. The license information computing unit 16 reserves the license information area 22 in the recordable area of the recording medium 20, and records the license information to the license information area 22.

The SHA-1 hash function is as follows.

The SHA-1 hash function is a hash function that is used for authentication, digital signatures, and the like. This hash function generates a 160-bit hash value from data of no more than 264 bits in length. Since the SHA-1 hash function involves an irreversible one-way function, it is computationally infeasible to recover the original data from the hash value. Also, it is computationally infeasible to generate data which is different from the original data but which hashes to the same value as the original data. This property can be utilized in the following manner. The sender sends data and a hash value generated from the data to the recipient. The recipient receives the data and the hash value, generates a hash value from the received data, and compares the generated hash value with the received hash value. This enables the recipient to detect whether or not the data has been tampered during communication.

Due to the property of the SHA-1 hash function, it is difficult to obtain the license information by using values other than the media number, encrypted content key, and master key which have been used by the license information computing unit 16 to generate the license information. In other words, the license information reflects all of the media number, encrypted content key, and master key that were used for generating the license information.

Accordingly, when the media number, encrypted content key, and master key which are reflected by the license information recorded in the license information area 22 are respectively the same as the media number recorded in the media number area 21, the encrypted content key recorded in the encrypted content key area 23, and the master key possessed by the recording device 10, the license information verifies that the data recorded on the recording medium 20 is authentic.

(Construction of the Reproduction Device 30)

The reproduction device 30 is constructed as follows.

The reproduction device 30 includes a master key storing unit 31, a content key decrypting unit 32, a content decrypting unit 33, a digital AV processing unit 34, a reference license information computing unit 35, a comparing unit 36, a first switch 37, a second switch 38, and an alarm 39.

The master key storing unit 31 is a memory in which a 56-bit master key has been stored in advance. This master key is the same as the master key stored in the master key storing unit 11 in the recording device 10.

The content key decrypting unit 32 decrypts the encrypted content key recorded on the recording medium 20, by using the master key. In detail, the content key decrypting unit 32 acquires the encrypted content key recorded in the encrypted content key area 23 and the master key stored in the master key storing unit 31, and decrypts the encrypted content key by using the master key to obtain the content key.

The content decrypting unit 33 decrypts the encrypted content recorded on the recording medium 20, by using the content key. The content decrypting unit 33 outputs the decrypted content to the digital AV processing unit 34. In detail, the content decrypting unit 33 acquires the content key decrypted by the content key decrypting unit 32 and the encrypted content recorded in the encrypted content area 24. The content decrypting unit 33 divides the encrypted content into 64-bit blocks, and decrypts each block by using the content key. The content decrypting unit 33 then outputs the content which is made up of the decrypted blocks, to the digital AV processing unit 34.

The digital AV processing unit 34 receives the content from the content decrypting unit 33, and converts the content to analog audio/video data. The digital AV processing unit 34 outputs the analog audio/video data to external devices such as a speaker and a display.

The first switch 37 is opened or closed under control of the comparing unit 36. When the first switch 37 is closed, the content key decrypting unit 32 is permitted to read the encrypted content key from the encrypted content key area 23. When the first switch 37 is opened, the content key decrypting unit 32 is inhibited from reading the encrypted content key from the encrypted content key area 23.

The second switch 38 is opened or closed under control of the comparing unit 36. When the second switch 38 is closed, power is supplied to the alarm 39. When the second switch 38 is opened, power is not supplied to the alarm 39.

The alarm 39 is a circuit that operates to produce a warning sound when supplied with power.

The reference license information computing unit 35 has a computational mechanism that performs the same computation as the license information computing unit 16, to compute reference license information. In detail, the reference license information computing unit 35 acquires the media number recorded in the media number area 21, the encrypted content key recorded in the encrypted content key area 23, and the master key stored in the master key storing unit 31. The reference license information computing unit 35 concatenates the media number, the master key, and the encrypted content key into one bit string. The order of concatenating these data is the same as the order used by the license information computing unit 16. The reference license information computing unit 35 takes this bit string as input, and performs a computation using a hash function such as SHA-1. As a result, the reference license information computing unit 35 obtains a hash value of 160 bits in length, and sets the hash value as reference license information.

The comparing unit 36 acquires the license information recorded in the license information area 22 and the reference license information generated by the reference license information computing unit 35, and compares the two values. If they match, the comparing unit 36 exercises control so that the encrypted content can be decrypted. On the other hand, if they do not match, the comparing unit 36 exercises control so that the decryption of the encrypted content is inhibited and the alarm 39 produces a warning sound.

In more detail, if the license information and the reference license information match, the comparing unit 36 closes the first switch 37 so that the content key decrypting unit 32 reads the encrypted content key from the encrypted content key area 23. As a result, the encrypted content key is decrypted, and the encrypted content is decrypted and reproduced.

If the license information and the reference license information do not match, the comparing unit 36 opens the first switch 37, and closes the second switch 38. Since the first switch 37 is opened, the content key decrypting unit 32 cannot read the encrypted content key from the encrypted content key area 23. Therefore, the encrypted content key is not decrypted, and so the encrypted content is neither decrypted nor reproduced. Also, since the second switch 38 is closed, power is supplied to the alarm 39 which accordingly produces a warning sound.

Thus, the reference license information computing unit 35 and the comparing unit 36 determine whether or not the media number recorded in the media number area 21, the encrypted content key recorded in the encrypted content key area 23, and the master key stored in the master key storing unit 31 are all reflected in the license information recorded in the license information area 22. If they are, the reference license information computing unit 35 and the comparing unit 36 exercise control so that the encrypted content is decrypted. Otherwise, the reference license information computing unit 35 and the comparing unit 36 exercise control so that the encrypted content is not decrypted and, instead, a warning sound is produced from the alarm 39.

Only when the media number, encrypted content key, and master key used for generating the reference license information are respectively the same as the media number, encrypted content key, and master key used for generating the license information, the reference license information and the license information will end up being the same. In other words, if any of the media number, encrypted content key, and master key used for generating the reference license information is different from the corresponding one of the media number, encrypted content key, and master key used for generating the license information, the reference license information will be different from the license information.

(Operation)

Operations of the above-constructed recording device 10 and reproduction device 30 are explained below.

Figure 4:
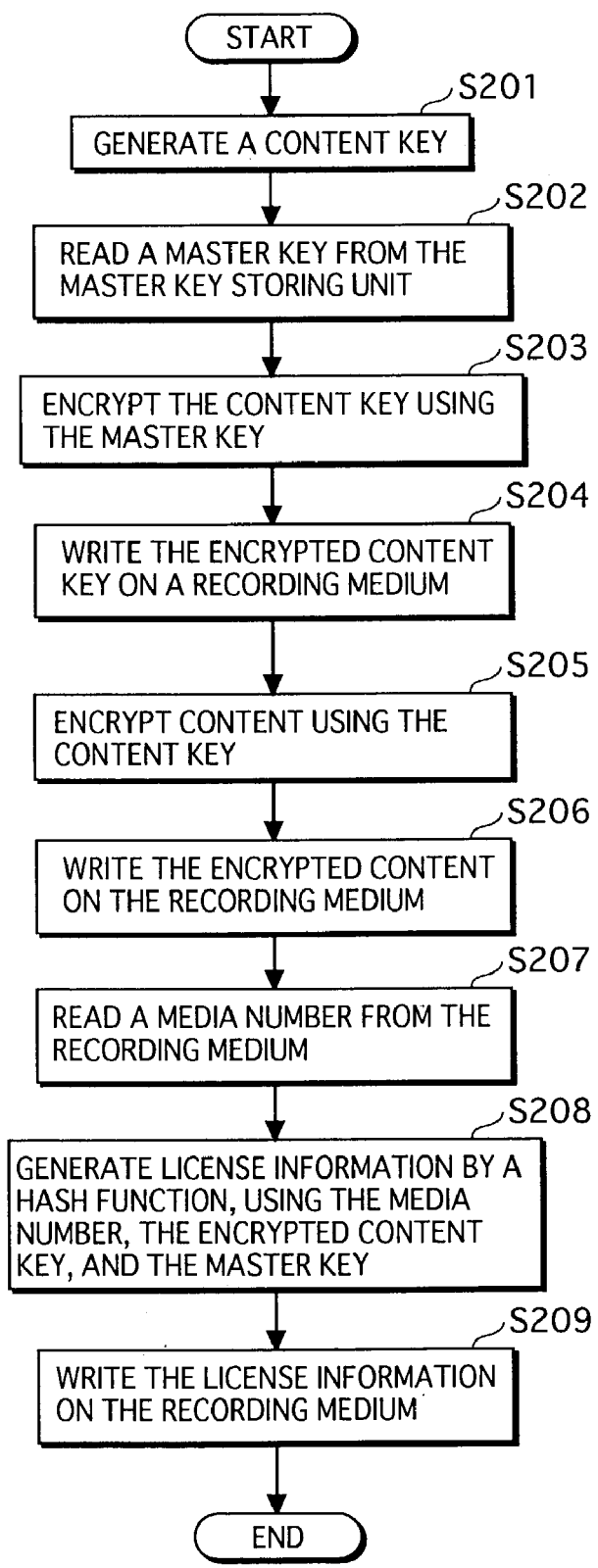
FIG. 4 is a flowchart showing an operation of a recording device shown in FIG. 3.

FIG. 4 is a flowchart showing an operation of the recording device 10.

First, the content key generating unit 12 generates a content key (S201).

The content key encrypting unit 13 reads a master key from the master key storing unit 11 (S202).

The content key encrypting unit 13 encrypts the content key by using the master key (S203).

The content key encrypting unit 13 reserves the encrypted content key area 23 in the recordable area of the recording medium 20, and records the encrypted content key to the encrypted content key area 23 (S204).

The content encrypting unit 15 reads content from the content storing unit 14. The content encrypting unit 15 divides the content into blocks of 64 bits, and encrypts each block by using the content key (S205).

The content encrypting unit 15 reserves the encrypted content area 24 in the recordable area of the recording medium 20, and records the encrypted content to the encrypted content area 24 (S206).

The license information computing unit 16 reads a media number from the media number area 21 of the recording medium 20 (S207).

The license information computing unit 16 generates license information by a hash function, by using the read media number, the master key stored in the master key storing unit 11, and the encrypted content key generated by the content key encrypting unit 13 (S208).

The license information computing unit 16 reserves the license information area 22 in the recordable area of the recording medium 20, and records the license information to the license information area 22 (S209).

Figure 5:
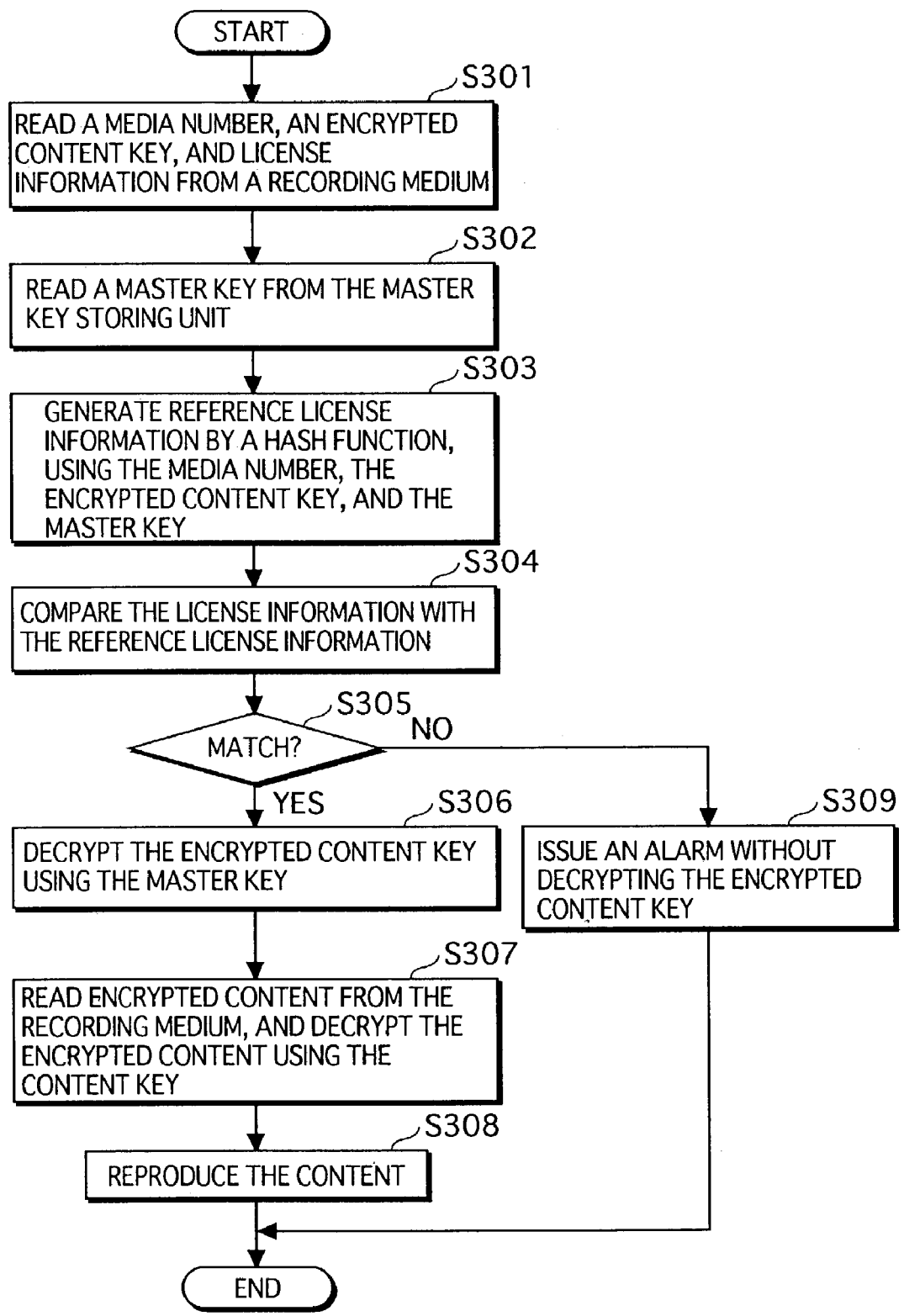
FIG. 5 is a flowchart showing an operation of a reproduction device shown in FIG. 3.

FIG. 5 is a flowchart showing an operation of the reproduction device 30.

The reference license information computing unit 35 reads a media number from the media number area 21 of the recording medium 20, and an encrypted content key from the encrypted content key area 23 of the recording medium 20. The comparing unit 36 reads license information from the license information area 22 of the recording medium 20 (S301).

The reference license information computing unit 35 reads a master key from the master key storing unit 31 (S302).

The reference license information computing unit 35 generates reference license information by a hash function, by using the media number, the encrypted content key, and the master key. The hash function used here is the same as the hash function used in step S208 (S303).

The comparing unit 36 compares the reference license information with the license information read from the recording medium 20 (S304).

If the license information and the reference license information match, steps S306-S308 are performed. Otherwise, step S309 is performed.

In more detail, if the license information and the reference license information match, the comparing unit 36 closes the first switch 37. As a result, the content key decrypting unit 32 reads the encrypted content key from the encrypted content key area 23, and decrypts the encrypted content key by using the master key stored in the master key storing unit 31 to obtain a content key (S306).

The content decrypting unit 33 reads encrypted content from the encrypted content area 24, and decrypts the encrypted content by using the content key to obtain content (S307).

The digital AV processing unit 34 reproduces the content as an audio/video signal, and outputs the audio/video signal to a speaker, a display, and the like (S308).

On the other hand, if the license information and the reference license information do not match, the comparing unit 36 opens the first switch 37, and closes the second switch 38. As a result, the content key decrypting unit 32 is inhibited form decrypting the encrypted content key, so that the encrypted content will be neither decrypted nor reproduced. Meanwhile, power is supplied to the alarm 39, which accordingly produces a warning sound and outputs the warning sound to a speaker or the like (S309).

(Conclusion)

According to the above construction of the copyright protection system 100, the reproduction device 30 does not reproduce a recording medium in any of the following Cases 1 to 3.

(Case 1) A media number used for generating license information which is recorded on a recording medium is different from a media number used for generating reference license information.

Suppose license information, an encrypted content key, and encrypted content which have been recorded on the recording medium 20 by the recording device 10 are copied to another recording medium. This being so, Case 1 applies when the reproduction device 30 tries to reproduce this recording medium, because a media number of this other recording medium is different from a media number of the recording medium 20.

(Case 2) An encrypted content key used for generating license information which is recorded on a recording medium is different from an encrypted content key used for generating reference license information.

Suppose an encrypted content key and encrypted content of another recording medium are copied to the encrypted content key area 23 and encrypted content area 24 of the recording medium 20 over an existing encrypted content key and encrypted content. This being so, Case 2 applies when the reproduction device 30 tries to reproduce the recording medium 20, because the encrypted content key copied from the other recording medium is usually different from the encrypted content key originally recorded on the recording medium 20. It is extremely rare that the copied encrypted content key and the original encrypted content key have the same value.

(Case 3) A master key used for generating license information which is recorded on a recording medium is different from a master key used for generating reference license information.

Suppose another recording device that does not have a master key possessed by the recording device 10 and reproduction device 30 records data on a recording medium. This being so, Case 3 applies when the reproduction device 30 tries to reproduce this recording medium. Since the master key is concealed from outside devices that do not belong to the copyright protection system 100, unless the master key is stolen, it is impossible for the outside devices to make a recording medium that can be reproduced by the reproduction device 30.

As described above, the reproduction device 30 reproduces only original recording media recorded by the recording device 10, and does not reproduce recording media made by unauthorized copying and the like. Thus, the copyright protection system 100 can keep content from being distributed by unauthorized copying and the like.

Second Embodiment

The following describes the second embodiment of the present invention.

The first embodiment has a construction in which the recording device 10 and the reproduction device 30 prestore the same master key that is necessary for encrypting and decrypting a content key and content. This being so, when there are a plurality of recording devices 10 and reproduction devices 30, each of these devices stores the same master key. In this construction, if one device is physically attacked, i.e., if one device is analyzed by an unauthorized party to reveal the master key stored in that device, not only the attacked device but also the rest of the devices become inoperative.

To overcome this problem, the second embodiment makes improvements to the copyright protection system 100 of the first embodiment, so that even when one recording device or reproduction device is physically attacked, the rest of the devices can be kept from becoming inoperative.

The following points are the main improvements in the second embodiment.

(1) A different device key is assigned to and stored in each of the plurality of recording devices and reproduction devices.

(2) A media key is processed and stored in the recording medium at the time of manufacturing. The media key is a key that is necessary for encrypting and decrypting a content key and content. Here, the media key is processed in such a way that the media key can be recovered from the processed media key only when a media key-acquirable device key is used and not when a media key-unacquirable device key is used (as will be described in detail later). The media key-acquirable device key is a device key assigned to a device that is not reported, at the time of manufacturing the recording medium, as having been physically attacked. The media key-unacquirable device key is a device key assigned to a device that is reported as having been physically attacked.

(3) A recording device tries to acquire the media key from the recording medium by using a device key held in the recording device. If the recording device has succeeded in acquiring the media key, the recording device performs encryption on a content key and content by using the media key. Otherwise, the recording device does not perform the encryption.

(4) Likewise, are production device tries to acquire the media key from the recording medium by using a device key held in the reproduction device. If the reproduction device has succeeded in acquiring the media key, the reproduction device performs decryption on an encrypted content key and encrypted content recorded on the recording medium by using the media key. Otherwise, the reproduction device does not perform the decryption.

A construction and operation of such an improved copyright protection system are described below.

(Construction)

Figure 6:
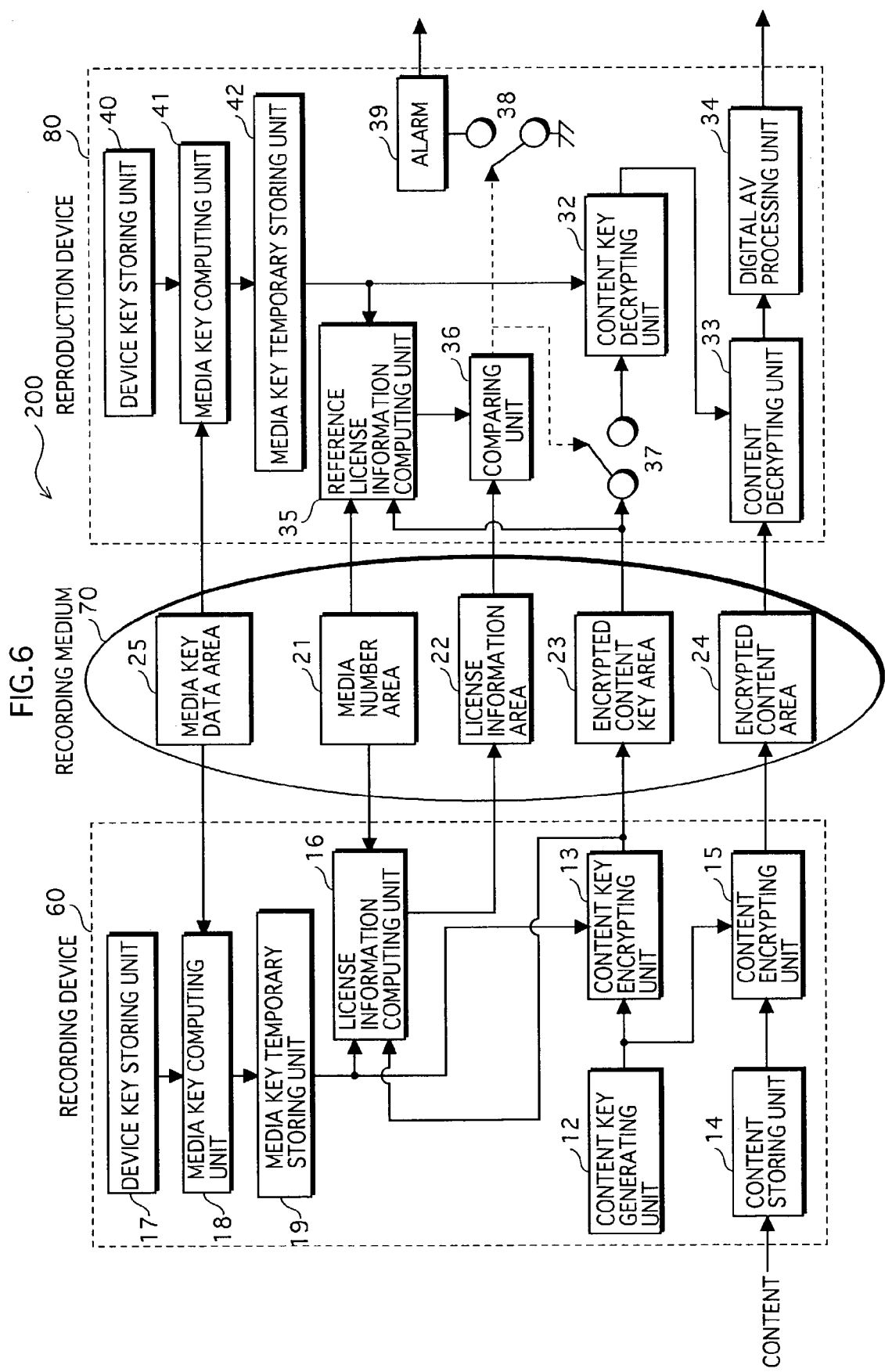
FIG. 6 is a block diagram showing a construction of a copyright protection system to which the second embodiment of the present invention relates.

FIG. 6 is a block diagram showing a construction of a copyright protection system 200 to which the second embodiment of the present invention relates.

In FIG. 6, the copyright protection system 200 is roughly made up of a recording device 60 and a reproduction device 80. The recording device 60 records encrypted content on a recording medium 70. The reproduction device 80 decrypts the encrypted content recorded on the recording medium 70, and reproduces the decrypted content.

Note here that construction elements which are the same as those in the first embodiment shown in FIG. 3 have been given the same reference numerals. Accordingly, the following explanation will focus on the differences with the first embodiment.

(Recording Medium 70)

The recording medium 70 is an optical disk similar to the recording medium 20. The recording medium 70 has a media key data area 25, in addition to the same construction as the recording medium 20.

The media key data area 25 is a read-only area. Media key data is recorded in the media key data area 25 at the time of manufacturing the recording medium 70.

The media key data is a result of processing a media key as explained in the above point (2).

Figure 7:
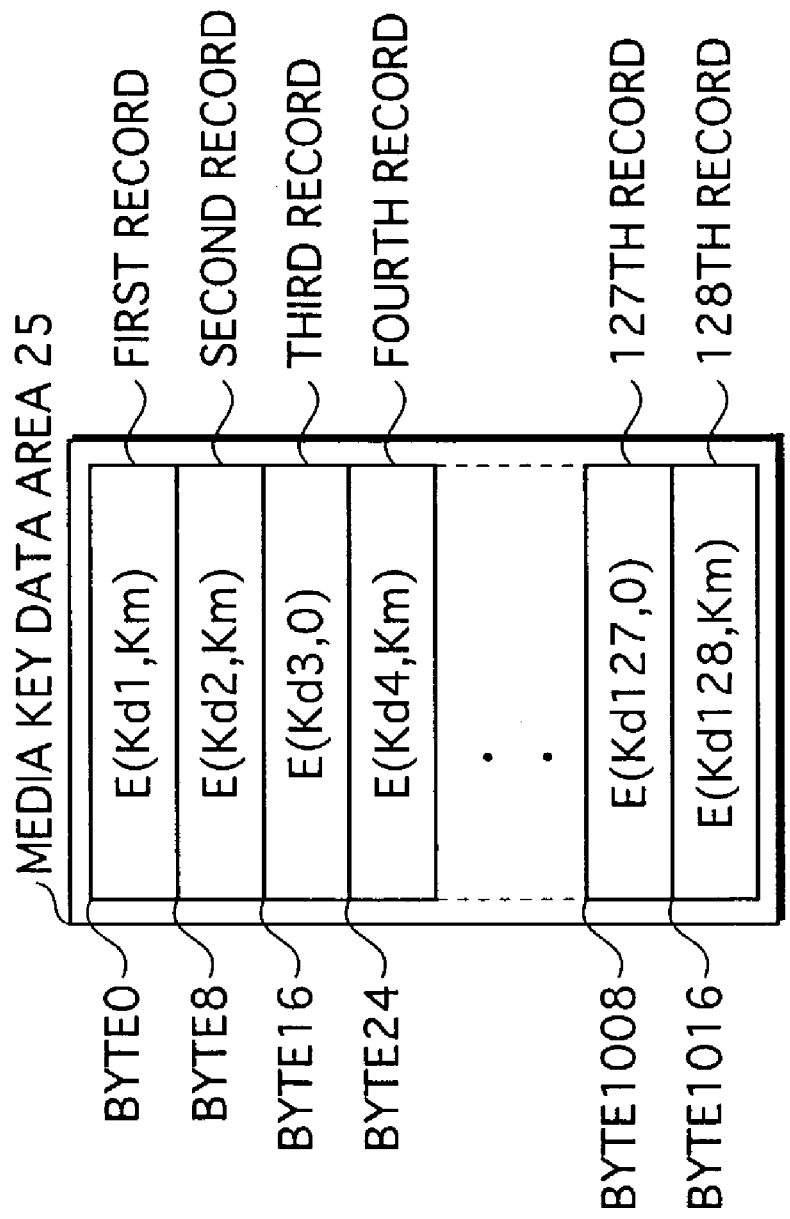
FIG. 7 shows one example of media key data recorded in a media key data area shown in FIG. 6.

FIG. 7 shows one example of media key data recorded in the media key data area 25. In FIG. 7, the media key data is made up of 128 records of 8 bytes in length. Each record contains ciphertext data which is expressed as either $E(Kd_i, Km)$ or $E(Kd_i,0)$ (i being an integer from 1 to 128).

Km denotes the media key which is a 56-bit random value. Here, a plurality of recording media 70 have been divided into groups of at least one recording medium 70, and a unique media key has been assigned to each group. The media key takes a value other than 0, to distinguish it from 0 in $E(Kd_i,0)$.

$Kd_i$ (i being an integer from 1 to 128) denotes a 56-bit device key. There are 128 device keys $Kd1, Kd2, \ldots, Kd128$, which are respectively assigned to and held in 128 devices (including recording devices 60 and reproduction devices 80) which have device numbers 1, 2, . . . , 128. The device numbers 1, 2, . . . , 128 have been respectively assigned to the 128 devices beforehand. The first to 128th records correspond to the device keys Kd1 to Kd128 respectively, and so correspond to the devices of the device numbers 1 to 128 respectively.

E( ) denotes an encryption algorithm such as DES. That is, $E(Kd_i,Km)$ denotes ciphertext obtained by encrypting the media key Km as plaintext by using the device key $Kd_i$ as an encryption key, according to DES. For example, $E(Kd2,Km)$ in the second record is ciphertext obtained by encrypting the media key Km by using a device key Kd2. Meanwhile, $E(Kd_i, 0)$ denotes ciphertext obtained by encrypting the value 0 by using the device key $Kd_i$. For example, $E(Kd3,0)$ in the third record is ciphertext obtained by encrypting 0 by using a device key Kd3.

On the other hand, when $E(Kd_i,Km)$ is decrypted by using the device key $Kd_i$, the outcome is the media key Km. For instance, when $E(Kd2,Km)$ in the second record is decrypted by using the device key Kd2, the media key Km is obtained. Meanwhile, when $E(Kd_i,0)$ is decrypted by using the device key $Kd_i$, the outcome is 0. For instance, when $E(Kd3,0)$ in the third record is decrypted by using the device key Kd3, 0 is obtained.

Thus, by setting the contents of the records corresponding to the 128 device keys as either $E(Kd_i,Km)$ or $E(Kd_i,0)$, the 128 device keys can be distinguished between the device keys with which the media key can be acquired (media key-acquirable device keys) and the device keys with which the media key cannot be acquired (media key-unacquirable device keys).

At the time of manufacturing, a manufacturer of the recording medium 70 obtains information concerning devices which have been physically attacked, and classifies the device keys into the media key-acquirable type and the media key-unacquirable type according to the obtained information. The manufacturer then generates media key data in which the contents of a record corresponding to each media key-acquirable device key are set as $E(Kd_i,Km)$, whereas the contents of a record corresponding to each media key-unacquirable device key are set as $E(Kd_i,0)$. The manufacturer records the media key data in the media key data area 25 of the recording medium 70. In this way, the media key can be acquired only when a media key-acquirable device key is used, and cannot be acquired when a media key-unacquirable device key is used.

(Construction of the Recording Device 60)

The recording device 60 differs from the recording device 10 in that a device key storing unit 17, a media key computing unit 18, and a media key temporary storing unit 19 are included in place of the master key storing unit 11.

The device key storing unit 17 is a memory in which a device key assigned to the recording device 60 has been stored in advance. The recording device 60 holds the device key in secrecy from outside the recording device 60.

The media key computing unit 18 reads the device key from the device key storing unit 17, and ciphertext data of a record corresponding to a device number of the recording device 60 from the media key data area 25. The media key computing unit 18 decrypts the ciphertext data by using the read device key. Since the ciphertext data is either E(Kdi,Km) or E(Kdi,0), decrypting the ciphertext data by using the device key Kdi produces the outcome which is either the media key Km or the value 0. The media key computing unit 18 judges whether or not the outcome is 0. If the outcome is 0, the recording device 60 terminates subsequent processing, that is, processing such as encrypting a content key and content is aborted.

If the outcome is the media key Km, the media key computing unit 18 temporarily stores the media key Km in the media key temporary storing unit 19. Here, temporarily storing the media key Km means that the media key Km is held in the media key temporary storing unit 19 only until the media key Km has been used for encrypting a content key and as a result has become unnecessary. After this, the media key temporary storing unit 19 is initialized to erase the media key Km. By erasing the media key Km once it has become unnecessary, damage caused by physical attack to the recording device 60 is minimized.

The media key temporary storing unit 19 is a memory for temporarily storing the media key Km which is acquired by the media key computing unit 18.

The license information computing unit 16 and the content key encrypting unit 13 are similar to those in the first embodiment, but differ in that the media key Km held in the media key temporary storing unit 19 is used instead of the master key.

(Construction of the Reproduction Device 80)

The reproduction device 80 differs from the reproduction device 30 in that a device key storing unit 40, a media key computing unit 41, and a media key temporary storing unit 42 are included in place of the master key storing unit 31.

The device key storing unit 40 is a memory in which a device key assigned to the reproduction device 80 has been stored in advance. The reproduction device 80 holds the device key in secrecy from outside the reproduction device 80.

The media key computing unit 41 reads the device key from the device key storing unit 40, and ciphertext data of a record corresponding to a device number of the reproduction device 80 from the media key data area 25. The media key computing unit 41 decrypts the ciphertext data by using the device key. Since the ciphertext data is either E(Kdi,Km) or E(Kdi,0), decrypting the ciphertext data by using the device key Kdi produces the outcome which is either the media key Km or the value 0. The media key computing unit 41 judges whether or not the outcome is 0. If the outcome is 0, the reproduction device 80 terminates subsequent processing, that is, processing such as decrypting an encrypted content key and encrypted content is aborted.

If the outcome is the media key Km, the media key computing unit 41 temporarily stores the media key Km in the media key temporary storing unit 42. Temporarily storing the media key Km means that the media key Km is held in the media key temporary storing unit 42 only until the media key Km has been used for decrypting an encrypted content key and as a result has become unnecessary. After this, the media key temporary storing unit 42 is initialized to erase the media key Km. By erasing the media key Km once it has become unnecessary, damage caused by physical attack to the reproduction device 80 is minimized.

The media key temporary storing unit 42 is a memory for temporarily storing the media key Km which is obtained by the media key computing unit 41.

The reference license information computing unit 35 and the content key decrypting unit 32 are similar to those in the first embodiment, but differ in that the media key Km held in the media key temporary storing unit 42 is used instead of the master key.

(Operation)

Operations of the above constructed recording device 60 and reproduction device 80 are described below.

The recording device 60 operates as follows.

(1) The media key computing unit 18 reads a device key from the device key storing unit 17, and ciphertext data of a record corresponding to the recording device 60 from the media key data area 25.

(2) The media key computing unit 18 decrypts the ciphertext data by using the device key, and judges whether or not the outcome is 0.

(3) If the outcome is 0, the recording device 60 terminates the subsequent encryption processing.

(4) If the outcome is not 0, the media key computing unit 18 stores the outcome in the media key temporary storing unit 19 as a media key.

(5) Following this, the recording device 60 performs the operation shown in FIG. 4, with "the master key storing unit 11" and "the master key" in FIG. 4 and its explanation being changed respectively to "the media key temporary storing unit 19" and "the media key".

(6) The recording device 60 initializes the media key temporary storing unit 19 to erase the media key.

On the other hand, the reproduction device 80 operates as follows.

(1) The media key computing unit 41 reads a device key from the device key storing unit 40, and ciphertext data of a record corresponding to the reproduction device 80 from the media key data area 25.

(2) The media key computing unit 41 decrypts the ciphertext data by using the device key, and judges whether or not the outcome is 0.

(3) If the outcome is 0, the reproduction device 80 terminates the subsequent decryption processing.

(4) If the outcome is not 0, the media key computing unit 41 stores the outcome in the media key temporary storing unit 42 as a media key.

(5) Following this, the reproduction device 80 performs the operation shown in FIG. 5, with "the master key storing unit 31" and "the master key" in FIG. 5 and its explanation being changed respectively to "the media key temporary storing unit 42" and "the media key".

(6) The reproduction device 80 initializes the media key temporary storing unit 42 to erase the media key.

(Conclusion)

According to the above construction of the copyright protection system 200, ciphertext data of each record in media key data is set as either E (Kdi,Km) or E (Kdi,0), so as to allow a media key to be acquired only when a media key-acquirable device key is used and not when a media key-unacquirable device key is used.

Suppose one device was physically attacked by an unauthorized party and a device key of that device was revealed. Then, the manufacturer of the recording medium 70 generates media key data in which ciphertext data of a record corresponding to the attacked device is set as E (Kdi,0), and records the media key data on the recording medium 70. In so doing, even when the unauthorized party tries to acquire the media key by using the revealed device key, the media key cannot be acquired. Without the media key, it is impossible to decrypt an encrypted content key and encrypted content which have been generated by using the media key. Hence, unauthorized use of content can be blocked.

Also, the copyright protection system 200 controls which devices can perform encryption and decryption and which devices cannot, by setting the ciphertext data of each record in the media key data either as E(Kdi,Km) or E(Kdi,0).

Suppose a device key of one device was revealed. Then, the manufacturer of the recording medium 70 sets ciphertext data of a record corresponding to that device as E (Kdi, 0), with it being possible to make that device inoperative.

Furthermore, according to the above construction of the copyright protection system 200, a plurality of recording devices and reproduction devices having different device keys can use the same recording medium, unless their ciphertext data is E(Kdi,0). This adds to the portability of the recording medium.

In the above example, the recording device 60 and the reproduction device 80 are each constructed to terminate encryption or decryption processing if the outcome of decrypting ciphertext data using a device key is 0. However, instead of terminating the processing, the recording device 60 and the reproduction device 80 may each be constructed to perform the encryption or decryption using the value 0 as a key. An encrypted by content key and encrypted content which are generated using 0 as a key cannot be decrypted by using the media key Km. Likewise, an encrypted content key and encrypted content which are generated by using the media key Km cannot be decrypted by using 0 as a key. Hence, unauthorized use of content through the use of an attacked device can be prevented.

Also, although a unique device key is assigned to each device, a unique device key may instead be assigned to each group that is made up of more than one device. In this case, if one device is physically attacked, ciphertext data corresponding to a group to which the attacked device belongs is set as E (Kdi,0). As a result, all devices belonging to that group are rendered inoperative. On the other hand, devices belonging to the rest of the groups remain operative.

Third Embodiment

The following describes the third embodiment of the present invention.

In the first and second embodiments, the recording device and the reproduction device have different construction elements, that is, the recording device has the content key encrypting unit, whereas the reproduction device has the content key decrypting unit. In the third embodiment, the recording device and the reproduction device are constructed to have the same content key generating unit, thereby reducing manufacturing costs when compared with the case where the two devices have different construction elements.

(Construction)

Figure 8:
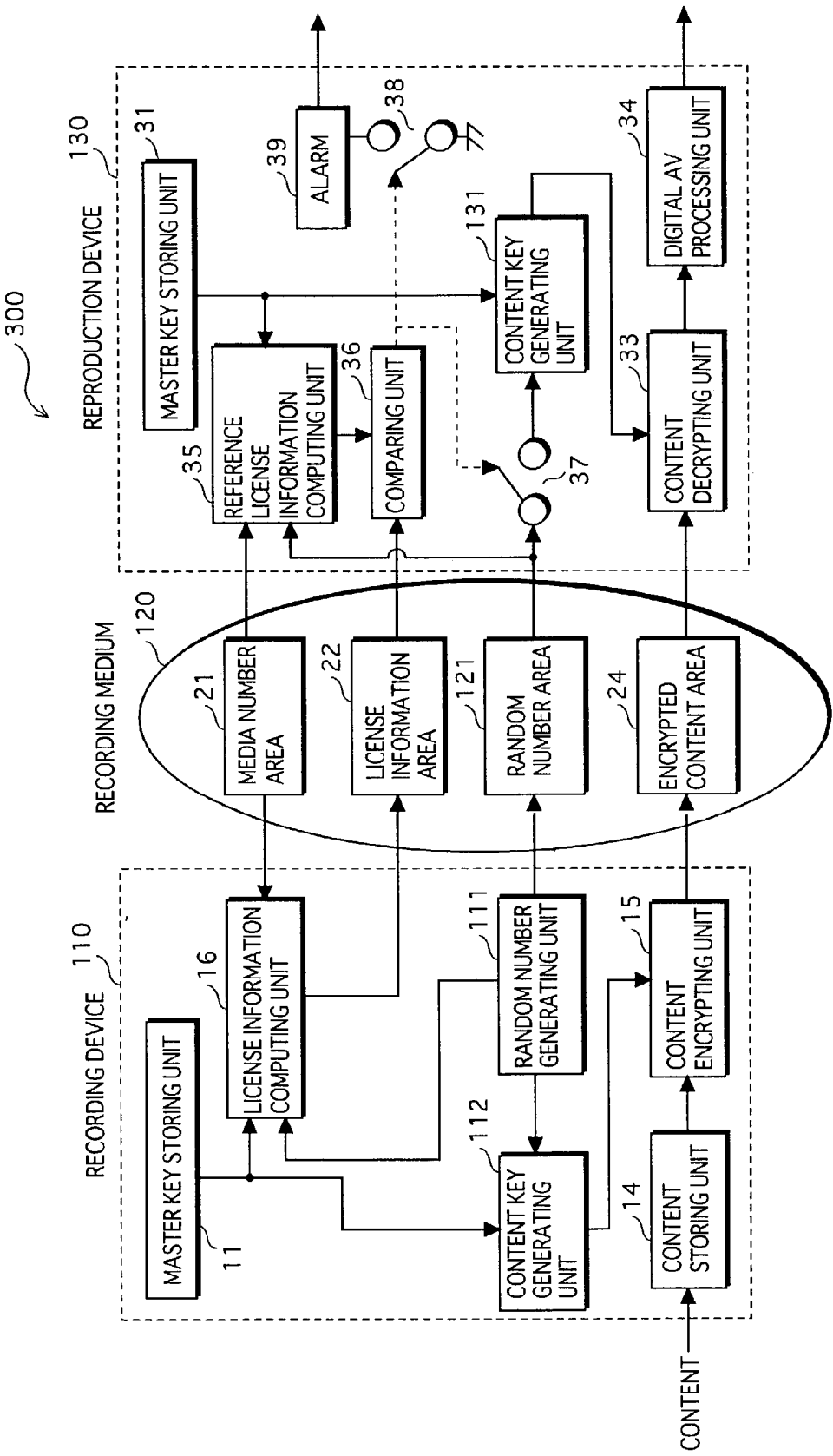
FIG. 8 is a block diagram showing a construction of a copyright protection system to which the third embodiment of the present invention relates.

FIG. 8 is a block diagram showing a construction of a copyright protection system 300 to which the third embodiment of the present invention relates.

In FIG. 8, the copyright protection system 300 is roughly made up of a recording device 110 and a reproduction device 130. The recording device 110 records encrypted content on a recording medium 120. The reproduction device 130 decrypts the encrypted content recorded on the recording medium 120, and reproduces the decrypted content.

Note here that construction elements which are the same as those in the first embodiment shown in FIG. 3 have been given the same reference numerals. Accordingly, the following explanation will focus on the differences with the first embodiment.

(Recording Medium 120)

The recording medium 120 differs from the recording medium 20 only in that a random number area 121 is provided instead of the encrypted content key area 23.

The random number area 121 is reserved in the recordable area of the recording medium 120 by the recording device 110, to record a random number. This random number is a source of a content key.

(Construction of the Recording Device 110)

The recording device 110 differs from the recording device 10 only in that a random number generating unit 111 and a content key generating unit 112 are included in place of the content key generating unit 12 and the content key encrypting unit 13.

The random number generating unit 111 generates a random number, and outputs the generated random number to the license information computing unit 16 and the content key generating unit 112. The random number generating unit 111 also reserves the random number area 121 in the recordable area of the recording medium 120, and records the random number in the random number area 121.

The content key generating unit 112 performs a computation according to the SHA-1 hash function or the like, by using the random number received from the random number generating unit 111 and a master key stored in the master key storing unit 11. As a result, the content key generating unit 112 generates a content key.

The content encrypting unit 15 encrypts content by using the content key generated by the content key generating unit 112, and records the encrypted content in the encrypted content area 24.

The license information computing unit 16 acquires a media number, the master key, and the random number generated by the random number generating unit 111, and concatenates these data into one bit string. The license information computing unit 16 takes this bit string as input, and performs a computation according to the SHA-1 hash function or the like to obtain a hash value. The license information computing unit 16 records the hash value in the license information area 22 as license information.

(Construction of the Reproduction Device 130)

The reproduction device 130 differs from the reproduction device 30 only in that a content key generating unit 131 is included in place of the content key decrypting unit 32.

The content key generating unit 131 is the same as the content key generating unit 112. The content key generating unit 131 performs the same computation as the content key generating unit 112 by using the random number recorded in the random number area 121 and a master key stored in the master key storing unit 31, to generate the content key.

The content decrypting unit 33 decrypts the encrypted content recorded in the encrypted content area 24, by using the content key generated by the content key generating unit 131.

The reference license information computing unit 35 acquires the media number, the master key, and the random number recorded in the random number area 121, and performs the same computation as the license information computing unit 16 to generate reference license information.

(Conclusion)

To manufacture a recording device and a reproduction device, a content key encrypting unit and a content key decrypting unit need to be produced in the case of the copyright protection system 100, whereas just two content key generating units need to be produced in the case of the copyright protection system 300. Thus, the copyright protection system 300 of the third embodiment can reduce manufacturing costs when compared with the copyright protection system 100 of the first embodiment.

Fourth Embodiment

The following describes the fourth embodiment of the present invention.

A copyright protection system of the fourth embodiment is a combination of the construction elements of the copyright protection systems 200 and 300 of the second and third embodiments.

(Construction)

Figure 9:
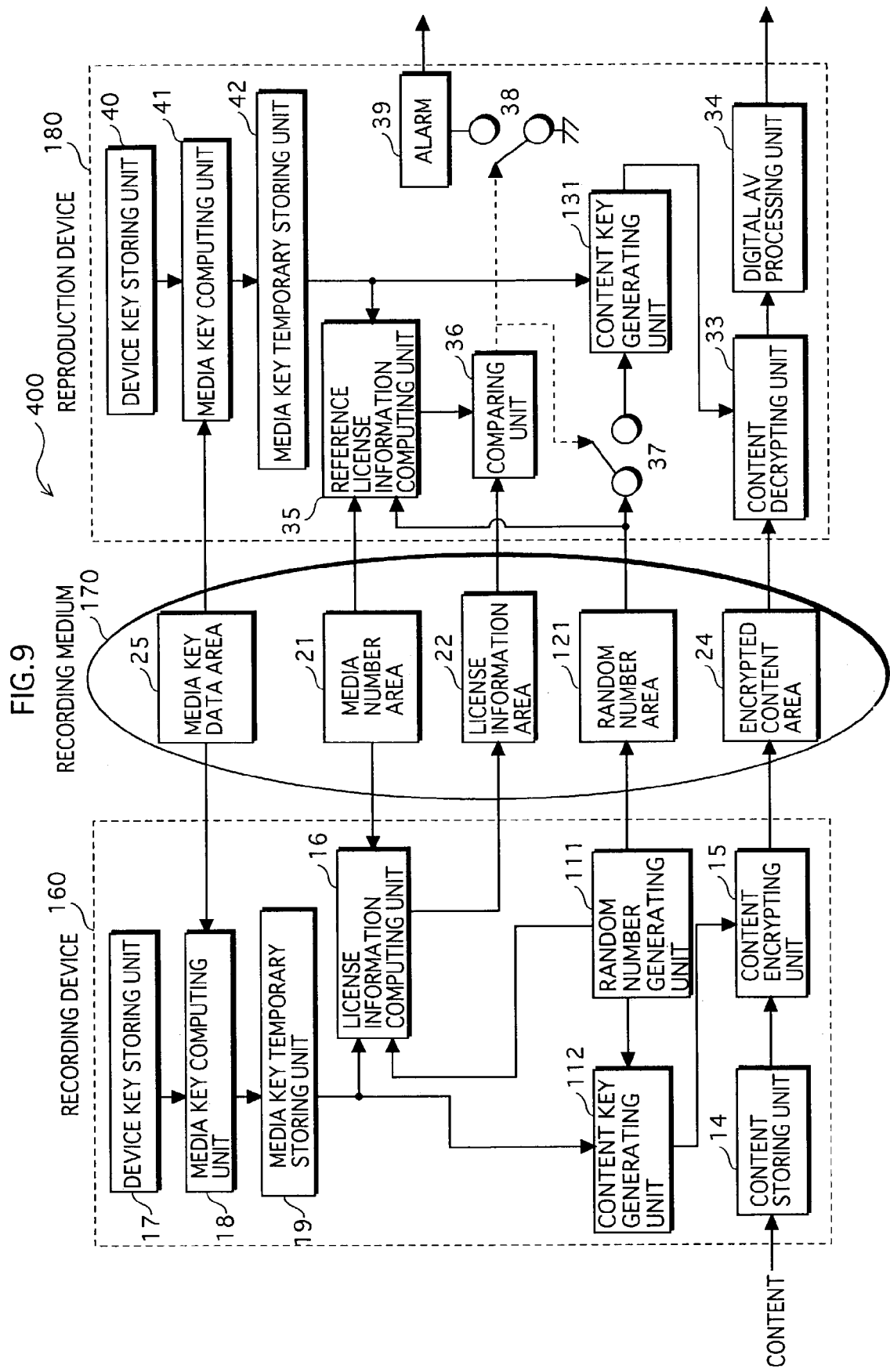
FIG. 9 is a block diagram showing a construction of a copyright protection system to which the fourth embodiment of the present invention relates.

FIG. 9 is a block diagram showing a construction of a copyright protection system 400 to which the fourth embodiment of the present invention relates.

In FIG. 9, the copyright protection system 400 is roughly made up of a recording device 160 and a reproduction device 180. The recording device 160 records encrypted content on a recording medium 170. The reproduction device 180 decrypts the encrypted content recorded on the recording medium 170, and reproduces the decrypted content.

Note here that construction elements which are the same as those in the second and third embodiments shown in FIGS. 6 and 8 have been given the same reference numerals.

(Recording Medium 170)

The recording medium 170 has a construction in which the media key data area 25 of the recording medium 70 has been added to the recording medium 120.

(Construction of the Recording Device 160)

The recording device 160 has a construction in which the master key storing unit 11 of the recording device 110 has been replaced with the device key storing unit 17, media key computing unit 18, and media key temporary storing unit 19 of the recording device 60.

(Construction of the Reproduction Device 180)

The reproduction device 180 has a construction in which the master key storing unit 31 of the reproduction device 130 has been replaced with the device key storing unit 40, media key computing unit 41, and media key temporary storing unit 42 of the reproduction device 80.

(Conclusion)

According to the above construction, the copyright protection system 400 has the advantages of both the copyright protection systems 200 and 300.

MODIFICATIONS

The present invention has been described by way of the first to fourth embodiments. However, it should be understood that the present invention is not limited to the above. Example modifications of the present invention are given below.

Figure 10:
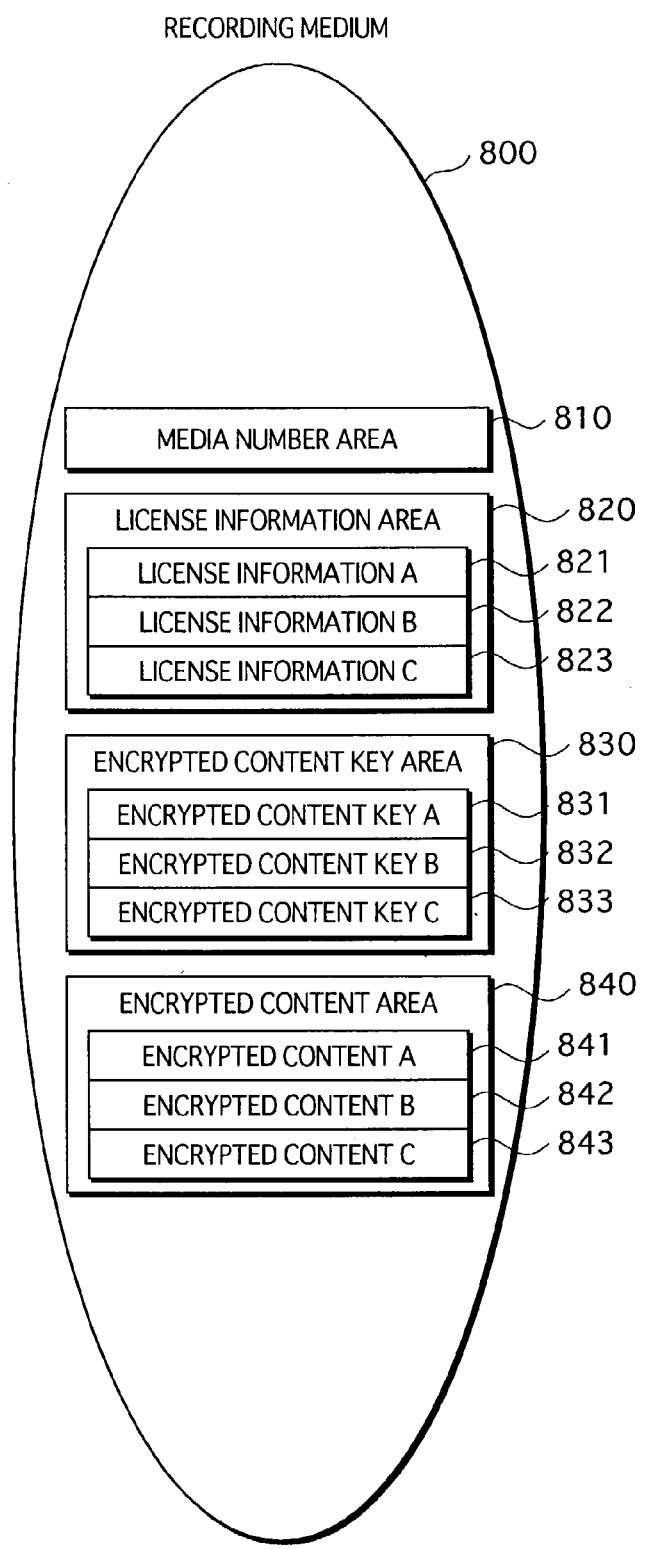
FIG. 10 shows an example construction of a recording medium.

(1) The above embodiments describe the case where the recording device records one set of encrypted content, one encrypted content key (or one random number), and one set of license information on the recording medium, but the present invention should not be limited thereto. For instance, the recording device may record a plurality of sets of encrypted content, a plurality of encrypted content keys, and a plurality of sets of license information, as shown in a recording medium 800 of FIG. 10.

In more detail, the recording device encrypts a plurality of sets of content A, B, and C by using content keys A, B, and C, respectively. The recording device then records the encrypted sets of content A, B, and C in an encrypted content area 840. The recording device also encrypts the content keys A, B, and C by using a master key, and records the encrypted content keys A, B, and C in an encrypted content key area 830. The recording device further generates license information A by using a media number, the master key, and the encrypted content key A, and records the license information A in a license information area 820. In a like manner, the recording device generates license information B and C by using the encrypted content keys B and C, respectively, and records the license information B and C in the license information area 820.

The reproduction device generates reference license information A by using the media number, the master key, and the encrypted content key A in the encrypted content key area 830, and compares the reference license information A with the license information A in the license information area 820. If they match, the reproduction device decrypts the encrypted content key A in the encrypted content key area 830 by using the master key. The reproduction device then decrypts the encrypted content A in the encrypted content area 840 by using the decrypted content key A, and reproduces the decrypted content A. The reproduction device performs the same processing on the encrypted content B and C.

Figure 11:
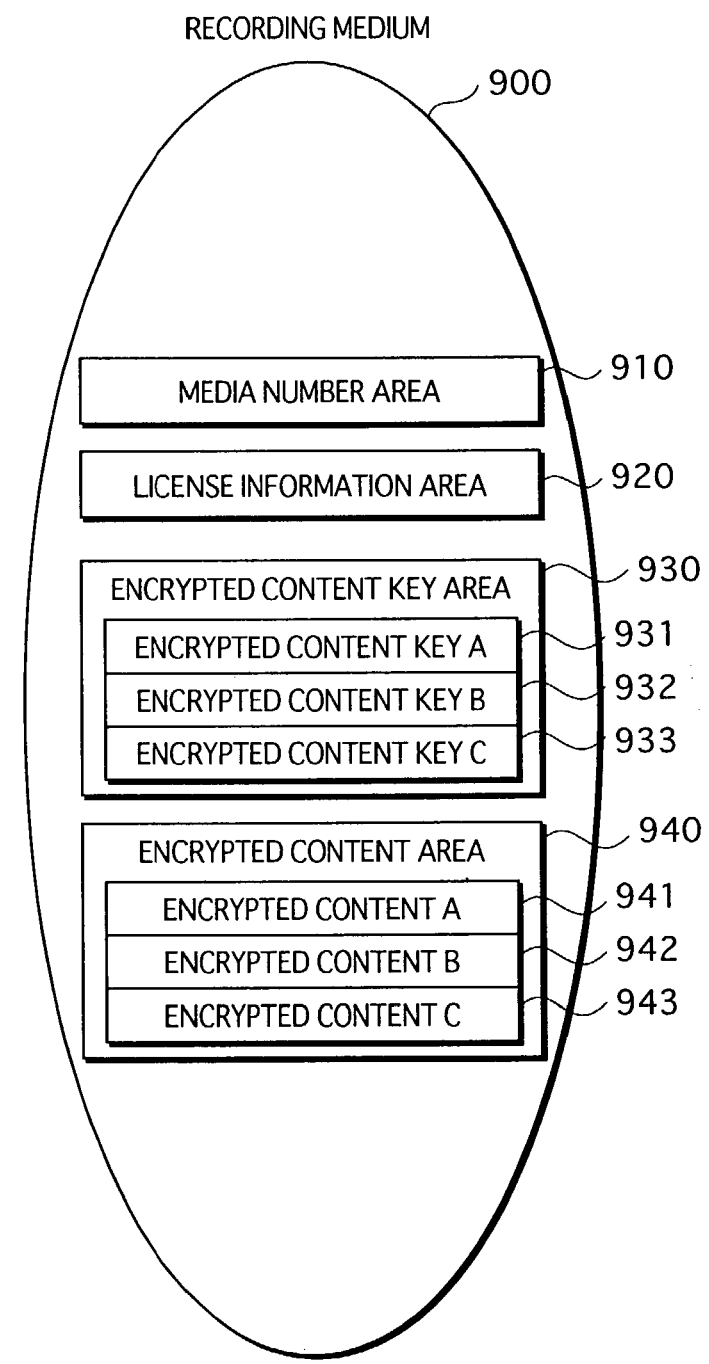
FIG. 11 shows another example construction of a recording medium.

(2) As an alternative, the recording device may record data as shown in a recording medium 900 of FIG. 11.

In more detail, the recording device generates the encrypted content A, B, and C and the encrypted content keys A, B, and C in the same way as the above (1), and records them in an encrypted content area 940 and an encrypted content key area 930. The recording device then generates license information by using the media number, the master key, and all of the encrypted content keys A, B, and C, and records the license information in a license information area 920.

The reproduction device generates reference license information by using the media number, the master key, and all of the encrypted content keys A, B, and C, and compares the reference license information with the license information in the license information area 920. If they match, the reproduction device decrypts the encrypted content keys A, B, and C by using the master key. The reproduction device then decrypts the encrypted content A, B, and C by using the decrypted content keys A, B, and C, respectively, and reproduces the decrypted content A, B, and C.

(3) Although the above embodiments describe the case where the recording medium is an optical disk, the recording medium may be a different type of recording medium such as a magnetic disk, a magneto-optical disk, or a memory card on which a media number has been recorded in an unrewritable state.

(4) Also, so long as the media number is recorded in an unrewritable state but can be read by a reading mechanism, the media number may be recorded in an area other than the unrewritable area of the recording medium.

(5) Although the above embodiments describe the case where the SHA-1 hash function is used for generating license information and the like, hash functions other than SHA-1 or operations other than hashing are also applicable. Also, encryption algorithms other than DES may be used. Furthermore, the bit length of each value is not limited to above.

(6) The above embodiments describe the case where license information and reference license information are generated using a master key, a media number, and information relating to decryption, but they may be generated using only the media number and the decryption-relating information without using the master key.

(7) The above embodiments describe the case where the comparing unit 36 controls each construction element by opening or closing the first switch 37 and the second switch 38. However, this can be modified so long as the digital AV processing unit 34 is allowed to reproduce content if and only if license information and reference license information match.

(8) The above embodiments describe the case where the alarm 39 produces a warning sound, but the alarm 39 may instead output data showing a warning message to a display.

(9) The present invention also applies to the methods corresponding to the operational procedures of the copyright protection systems of the first to fourth embodiments and the modifications (1) and (2).

(10) The operational procedures of the copyright protection systems of the first to fourth embodiments and the modifications (1) and (2) may be realized by computer programs that are executed by computers. Such computer programs may be distributed having been recorded onto a storage medium or by being transmitted via a communication path. Examples of such a storage medium include an IC card, an optical disk, a flexible disk, and a ROM.

(11) The construction elements described in the first to fourth embodiments and the modifications (1) to (10) may be freely combined.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A copyright protection system comprising:
a recording device for recording encrypted content on a recording medium loaded to said recording device, the recording medium being removable from said recording device and having an unrewritable area in which a media number for identifying the removable recording medium is recorded; and
a reproduction device for reproducing the encrypted content,
wherein said recording device includes:
content key storing unit configured to store a content key;
a first master key storing unit configured to store a first master key assigned to said recording device;
a content key encrypting unit configured to encrypt the content key based on the first master key stored in said first master key storing unit, the content key to be used to decrypt the encrypted content;
a generating unit configured to obtain the media number from the removable recording medium, and generate license information based on the media number and the content key; and
a recording unit configured to record the license information, the encrypted content key, and the encrypted content on the removable recording medium,
wherein said reproduction device includes:
a second master key storing unit configured to store a second master key assigned to said reproduction device;
a computing unit configured to obtain a media number from an unrewritable area and an encrypted content key that are recorded on a removable recording medium loaded to said reproduction device, and generate reference license information based on the media number and the encrypted content key;
a comparing unit configured to (i) obtain the license information from the removable recording medium loaded to said reproduction device and the reference license information from said computing unit, and (ii) compare the license information and the reference license information to determine whether or not the license information and the reference license information match each other, thereby determining whether or not at least one of (a) the removable recording medium loaded to said reproduction device is a copied medium, the copied medium having a different media number from the removable recording medium loaded to said recording device and having recorded therein copies of the license information, the encrypted content key, and the encrypted content, and (b) the content key has been tampered with;
a decrypting unit configured to obtain the encrypted content and the encrypted content key from the removable recording medium loaded to said reproduction device, obtain the second master key stored in said second master key storing unit, decrypt the encrypted content key by using the second master key, and decrypt the encrypted content by using the content key to generate decrypted content;
a reproduction unit configured to reproduce the decrypted content; and
a suppressing unit configured to suppress the reproduction of the decrypted content when said comparing unit determines that the license information does not match the reference license information.

2. The copyright protection system of claim 1, wherein:
said first master key storing unit is configured to store the first master key by either acquiring the first master key from outside said recording device or storing the first master key in advance;
said content key encrypting unit is configured to encrypt the content key by using the first master key according to a secret key cipher;
said second master key storing unit is configured to store the second master key by either acquiring the second master key from outside said reproduction device or storing the second master key in advance; and
said decryption unit is configured to decrypt the encrypted content key by using the second master key according to the secret key cipher.

3. The copyright protection system of claim 2, wherein:
secret key information is recorded on the removable recording medium, the secret key information being an encrypted secret key which can be correctly decrypted only when a specific device key is used;

each of said first master key storing unit and said second master key storing unit includes: a device key storing unit configured to store, in advance, a device key that is unique to a device to which said device key storing unit belongs; and a secret key decrypting unit configured to decrypt the secret key information recorded on the removable recording medium by using the device key stored in said device key storing unit; and each of said recording device and said reproduction device further includes a stopping unit configured to stop subsequent processing if said respective secret key decrypting unit has failed to correctly decrypt the secret key information.

4. The copyright protection system of claim 1, wherein:
said generating unit is configured to generate a set of license information for each of a plurality of sets of encrypted content, by generating license information based on the media number and a set of content keys corresponding to the set of encrypted content;

said recording unit is configured to record the plurality of sets of encrypted content, the plurality of sets of content keys which are in a one-to-one correspondence with the plurality of sets of encrypted content, and the plurality of sets of license information which are generated by said generating unit and are in a one-to-one correspondence with the plurality of sets of encrypted content, on the removable recording medium in combination; and said comparing unit and said decrypting unit respectively perform the comparing and the decryption on each combination recorded on the removable recording medium.

5. The copyright protection system of claim 1, wherein said generating unit is configured to generate a set of license information for a plurality of sets of encrypted content, by generating license information based on the media number and a plurality of sets of content keys which are in a one-to-one correspondence with the plurality of sets of encrypted content.

6. The copyright protection system of claim 1, wherein the first master key stored in said first master key storing unit is identical to the second master key stored in said second master key storing unit.

7. The copyright protection system of claim 1, wherein said comparing unit is configured to determine that the license information does not match the reference license information when the media number obtained by said generating unit to generate the license information is not identical to the media number obtained from the removable recording medium by said computing unit to generate the reference license information.

8. The copyright protection system of claim 1, wherein said generating unit is configured to generate the license information based on the media number and the encrypted content key.

9. The copyright protection system of claim 8, wherein said comparing unit is configured to determine that the license information does not match the reference license information when at least one of (a) the media number obtained by said generating unit to generate the license information is not identical to the media number obtained from the removable recording medium by said computing unit to generate the reference license information, and (b) the encrypted content key obtained by said generating unit to generate the license information is not identical to the encrypted content key obtained from the removable recording medium by said computing unit to generate the reference license information.

10. The copyright protection system of claim 1, wherein:
said generating unit is configured to generate the license information without using the first master key; and
said computing unit is configured to generate the reference license information without using the second master key.

11. The copyright protection system of claim 10, wherein:
said generating unit is configured to generate the license information based on only the media number and the content key; and
said computing unit is configured to generate the reference license information based on only the media number and the encryption content key.

12. A reproduction device for reproducing encrypted content recorded on a recording medium removable from said reproduction device, the removable recording medium having an unrewritable area in which a media number for identifying the removable recording medium is recorded, wherein the encrypted content, an encrypted content key, and license information have been recorded on the removable recording medium by a recording device storing a content key, the content key to be used to decrypt the encrypted content, wherein the encrypted content key recorded on the removable recording medium is the content key encrypted by the recording device based on a first master key assigned to the recording device, and the license information recorded on the removable recording medium is based on the media number and the content key, said reproduction device comprising:
a second master key storing unit configured to store a second master key assigned to said reproduction device;

a computing unit configured to obtain the media number from the unrewritable area and the encrypted content key that are recorded on the removable recording medium loaded to said reproduction device, and generate reference license information based on the media number and the encrypted content key;

a comparing unit configured to (i) obtain the license information from the removable recording medium and the reference license information from said computing unit, and (ii) compare the license information and the reference license information to determine whether or not the license information and the reference license information match each other, thereby determining whether or not at least one of (a) the removable recording medium loaded to said reproduction device is a copied medium, the copied medium having a different media number from the removable recording medium on which the encrypted content is recorded originally, and having recorded thereon copies of the license information, the encrypted content key, and the encrypted content, and (b) the content key has been tampered with;

a decrypting unit configured to obtain the encrypted content and the encrypted content key from the removable recording medium, obtain the second master key stored in said master key storing unit, decrypt the encrypted content key by using the second master key, and decrypt the encrypted content by using the content key to generate decrypted content;

a reproduction unit configured to reproduce the decrypted content; and a suppressing unit configured to suppress the reproduction of the decrypted content when said comparing unit determines that the license information does not match the reference license information.

13. A copyright protection method for use in a copyright protection system including a recording device for recording encrypted content on a recording medium loaded to the recording device, the recording medium being removable from the recording device, and a reproduction device for reproducing the encrypted content recorded on the removable recording medium, the removable recording medium having an unrewritable area in which a media number for identifying the removable recording medium is recorded, the recording device storing a first master key assigned to the recording device, and the reproduction device storing a second master key assigned to the reproduction device, wherein, in the recording device, the method comprises:
encrypting a content key stored in the recording device based on the first master key stored in the recording device, the content key to be used to decrypt the encrypted content;
obtaining the media number from the removable recording medium, and generating license information based on the media number and the content key;
recording the license information, the encrypted content key, and the encrypted content on the removable recording medium; and wherein, in the reproduction device, the method comprises:
obtaining a media number from an unrewritable area and an encrypted content key that are recorded on a removable recording medium loaded to the reproduction device, and generating reference license information based on the media number and the encrypted content key;
obtaining the license information from the removable recording medium loaded to the reproduction device and the generated reference license information, and comparing the obtained license information and the generated reference license information to determine whether or not the obtained license information and the generated reference license information match each other, thereby determining whether or not at least one of (a) the removable recording medium loaded to the reproduction device is a copied medium, the copied medium having a different media number from the removable recording medium loaded to the recording device and having recorded therein copies of the license information, the encrypted content key, and the encrypted content, and (b) the content key has been tampered with;
obtaining the encrypted content and the encrypted content key from the removable recording medium loaded to the reproduction device, decrypting the encrypted content key by using the stored second master key, and decrypting the encrypted content by using the content key to generate decrypted content;
reproducing the decrypted content; and
suppressing said reproducing of the decrypted content when said comparing determines that the obtained license information does not match the generated reference license information.

14. A reproduction method for reproducing encrypted content recorded on a recording medium removable from a reproduction device, the removable recording medium having an unrewritable area in which a media number for identifying the removable recording medium is recorded,
wherein the encrypted content, an encrypted content key, and license information have been recorded on the removable recording medium by a recording device storing a content key, the content key to be used to decrypt the encrypted content,
wherein the encrypted content key recorded on the removable recording medium is the content key encrypted by the recording device based on a first master key assigned to the recording device, and the license information recorded on the removable recording medium is based on the media number and the content key, and
wherein said method comprises:
storing a second master key;
obtaining the media number from the unrewritable area and the encrypted content key from the removable recording medium loaded to the reproduction device, and generating reference license information based on the media number and the encrypted content key;
obtaining the license information from the removable recording medium loaded to the reproduction device and the generated reference license information, and comparing the obtained license information and the generated reference license information to determine whether or not the obtained license information and the generated reference license information match each other, thereby determining whether or not at least one of (a) the removable recording medium loaded to the reproduction device is a copied medium, the copied medium having a different media number from the removable recording medium loaded to the recording device and having recorded therein copies of the license information, the encrypted content key, and the encrypted content, and (b) the content key has been tampered with;
obtaining the encrypted content and the encrypted content key from the removable recording medium loaded to the reproduction device, decrypting the encrypted content key by using the second master key, and decrypting the encrypted content by using the content key to generate decrypted content;
reproducing the decrypted content; and
suppressing said reproducing of the decrypted content when said comparing determines that the obtained license information does not match the generated reference license information.

15. A reproduction program, stored on a computer-readable medium, for use in a reproduction device for reproducing encrypted content recorded on a recording medium removable from the reproduction device, the removable recording medium having an unrewritable area in which a media number that is for identifying the removable recording medium is recorded,
wherein the encrypted content, an encrypted content key, and license information have been recorded on the removable recording medium by a recording device storing a content key, the content key to be used to decrypt the encrypted content,
wherein the encrypted content key recorded on the removable recording medium is the content key encrypted by the recording device based on a first master key assigned to the recording device, and the license information recorded on the removable recording medium is based on the media number and the content key, and
wherein the reproduction program causes the reproduction device to execute operations comprising:
storing a second master key assigned to the reproduction device;

obtaining the media number from the unrewritable area and the encrypted content key from the removable recording medium loaded into the reproduction device, and generating reference license information based on the media number and the encrypted content key;

obtaining the license information from the removable recording medium loaded to the reproduction device and the generated reference license information, and comparing the obtained license information and the generated reference license information to determine whether or not the obtained license information and the generated reference license information match each other, thereby determining whether or not at least one of (a) the removable recording medium loaded to the reproduction device is a copied medium, the copied medium having a different media number from the removable recording medium loaded to the recording device and having recorded therein copies of the license information, the encrypted content key, and the encrypted content, and (b) the content key has been tampered with;

obtaining the encrypted content and the encrypted content key from the removable recording medium loaded to the reproduction device, decrypting the encrypted content key by using the stored second master key, and decrypting the encrypted content by using the content key to generate decrypted content;

reproducing the decrypted content; and suppressing said reproducing of the decrypted content when said comparing determines that the obtained license information does not match the generated reference license information.

* * * * *